United States Patent Office 3,591,454
Patented July 6, 1971

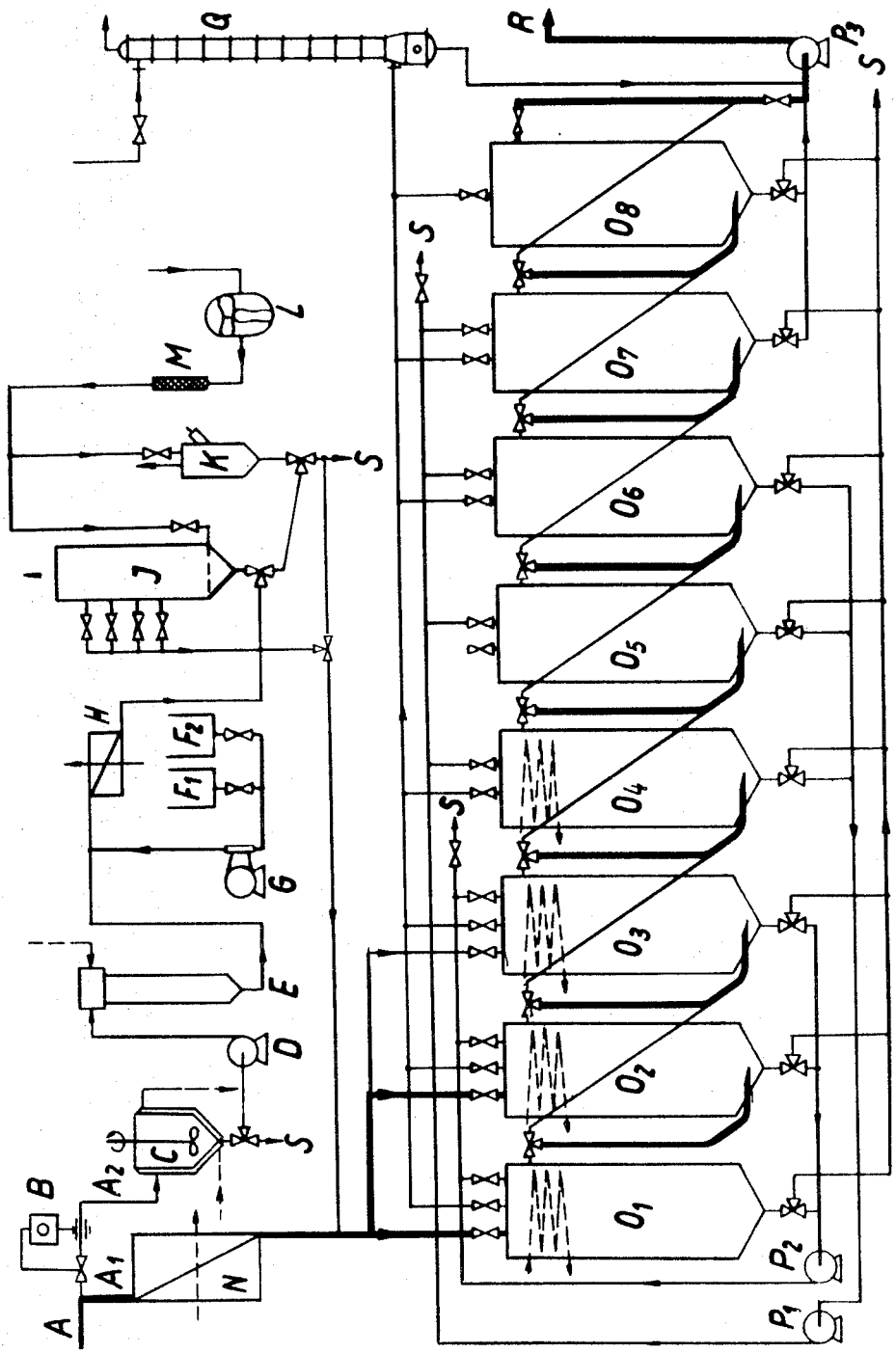

3,591,454
PROCESS AND APPARATUS FOR THE CONTINUOUS FERMENTATION OF DRAFF-CONTAINING MASHES
Hans-Ulrich Laatsch, Berlin, Germany, assignor to Forschunginstitut fur die Gasungsindustrie Enzymologie und technische Mikrobiologie, Berlin, Germany
Filed May 22, 1968, Ser. No. 731,111
Int. Cl. C12b 1/00
U.S. Cl. 195—15                                    11 Claims

ABSTRACT OF THE DISCLOSURE

A process for the continuous fermentation of draff-containing mashes, consisting preferably of starch-containing raw products, is used for obtaining ethanol. In accordance with the process, mashes intended for fermentation and flowing in a continuous stream, are separated into two streams the amount of which have a ratio of of 1:10 to 1:12, whereupon the smaller stream is consecutively saccharified, sterilized, cooled, diluted, acidified, treated with feed salts, and enriched with yeast cells up to a concentration of 350 to 400 million cells/ml. Then the smaller stream is united with the larger stream and the two flow jointly through a fermentation battery and are jointly fermented. A suitable apparatus is used to carry out this process.

---

This invention relates to a process and an apparatus for the continuous fermentation of draff-containing mashes, preferably from starch-containing raw products, which flow in an uninterrupted current. The process is used for the subsequent recovery of ethanol.

Continuous ethanol production by fermentation procedures is now carried out by using mashes from raw products containing polysaccharides, preferably starch-containing products, which are broken up and saccharified by known continuous processes. Then the mashes are subjected to alcoholic fermentation either in individual fermentation containers according to a conventional periodically operating process, or in fermentation containers interconnected in series to form a battery according to a newer flow process.

The state of the art pertaining to the above fermentation processes and the corresponding apparatus, is as follows:

(1) Periodically operating fermentation process

In accordance with the periodically operating fermentation process, which is also known as the filling process, the usual fermentation vessels are filled one after the other with fresh mashes. The mashes were initially treated with pitching yeast which was multiplied in separate containers. Mashes remain in the fermentation vessels until the sugar contained therein is transformed to the greatest possible extent into ethanol and carbon dioxide by the enzymatic action of the yeast. Upon completion of the fermentation, which usually takes 72 hours, the vessels are emptied and the mashes are subjected to distillation. After cleaning, the vessels can be filled with a fresh supply of mashes. The advantage of this process is that the fermentation requires little supervision and that contamination of infected mashes is not transmitted to mashes in other fermentation vessels.

(2) Cyclic fermentation process

A cyclic fermentation process is described by Jarowenko in a Russian language publication entitled "Continuous Process of Alcoholic Fermentation" (pp. 98–103, Fischtschepromisdat, Moscow, 1958). According to this process a fermentation battery consisting of eight closed vessels is continuously filled by inflow in the first vessel and overflow into the following vessel until the seventh vessel is filled with fermenting mashes. This ends a "cycle." The post-fermentation takes place periodically and the vessels are emptied one after the other starting with the seventh vessel and ending with the first vessel. Then the second cycle starts by filling the vessels of the battery consecutively in the reverse direction starting with the eighth vessel and ending with the second vessel. Thus the supply of mashes changes continuously in two directions. The cleaning and disinfection of each vessel takes place as soon as it has been emptied. This process has the advantage of better utilization of the volume of the fermentation vessels by diminishing the duration of fermentation to about 64 hours.

(3) Continuous two stream process

A continuous fermentation process was developed in the U.S.S.R. by Polewoi and described in the publication Spiritowaja Promyschlennost (Nr 5, pp. 11–15, 1960). According to this process a fermentation battery is used consisting of eight vessels which are joined by a ring conduit mounted at about three quarters of the height of the vessels. To start the fermentation vessel 1 is supplied with multiplied yeast mashes and is filled by the inflow of fresh mashes. As soon as a yeast cell concentration of 100 mill./ml. is attained, the ring conduit is so opened that 65% of the mashes flow into vessel 2 while the remaining 35% flow in the opposite direction into vessel 8. As soon as the vessel 2 is filled the overflow is directed solely thereto. The overflow fills with 65% the vessel 3 until it is full and with 35% the vessels 1 to 8. After the battery has been filled from both sides, the yeast production takes place in one of the vessels where the two overflows meet before the respective inflow vessel, while another vessel, which is the final vessel from which the ripe mashes are forwarded to distillation, is cleaned, sterilized and filled with fresh mashes by being connected with the inflow vessel, the former yeast multiplying vessel. Due to this circular flow the fermentation apparatus operates continuously without requiring a special yeast producing station. Since the fermentation time period amounts to 72 hours, as is the case with the periodically operating process, the advantage of this process consists solely in the elimination of the yeast producing device.

(4) Continuous flow process

The up to now best fermentation process for draff-containing mashes was patented by Jarowenko et al. (U.S.S.R. Patent No. 137,872 of May 21, 1960). The fermentation plant of this invention consists of periodically operating yeast producing and pre-fermentation devices, as well as of six to eight fermentation vessels connected in series to form a battery. Yeast mashes produced in a pre-fermentation vessel up to a volume of 50% of a filled vessel, are then let off into a first fermentation vessel. At the same time, fresh saccharified mashes flow in this vessel. All other vessels of the battery are finally filled by overflow pipes. After the second and third vessels have been filled the flow is equally distributed between the first three vessels. The yeasted mashes are continuously removed from the last vessel of the battery.

To remove infections of mashes all vessels, one after the other, are emptied by pumps into the following vessel, are then cleaned, disinfected and thereupon reintroduced into the system. The advantages of this process consist in the continuity of the flow of the mashes, the flow being interrupted only by cleanings, and in the uniform fermentation conditions which can be maintained in the individual vessels.

However, all these processes have the following drawbacks.

The most important drawbacks of the periodically operating process consist in the fact that it is periodical and in the comparatively long pre-fermentation phase in which yeast multiplication takes place. Due to the long fermentation time period which is thereby necessitated, the fermentation vessels must have a large volume.

In the cyclic process the yeast multiplication takes place periodically with high operational output. The greatest drawback of this process consist in that the initially filled vessels of the fermentation battery are the last to be cleaned and disinfected. This makes the process greatly subject to infections.

The drawbacks of the continuous two stream process include the continuous changing of the vessels of the battery for yeast production. This makes the process unstable. Furthermore, the duration of fermentation is not shortened as compared to the periodically operating process.

The drawbacks of the continuous flow process consist in the yeast must be also periodically bred and in that automation is made difficult by constantly necessary cleaning steps, during which the continuous flow is interrupted.

All prior art processes for the fermentation of draff-containing mashes have in common the drawback that the yeast propagation and alcohol production must take place in the same fermentation containers. Due to the quick increase in the alcohol concentration in the mashes which then takes place, an advantageous quick yeast propagation to an optional cell concentration is made difficult.

An object of the present invention is to eliminate the drawbacks of prior art processes for the fermentation of draff-containing mashes, particularly those from starch-containing raw products by the provision of a suitable process and apparatus.

Other objects of the present invention will become apparent from the following detailed description.

Thus the purpose of the present invention consists in providing an automatic and fully continuous process for fermenting draff-containing mashes, preferably from starch-containing raw products, wherein the yeast multiplication and speed of fermentation can be regulated independently from each other and without the necessity of disturbing the flow through the fermentation battery by the necessary cleaning steps. Despite a relatively short duration of fermentation it is necessary to provide and if possible, complete fermentation of the available sugar without the increased formation of by-products.

Another purpose is to develop a fermentation plant wherein yeast multiplication can be carried out aerobically and alcohol formation can be carried out anaerobically separately from each other in compliance with the above-mentioned requirements.

In the accomplishment of the objectives of the present invention it was found desirable to divide a flow of mashes coming from a continuously operating breaking up and saccharifying apparatus, into two partial streams, suitable amount regulation being used to divide the volume of the two streams in accordance with the ratio 1:10 to 1:12. The smaller one of the two partial streams is caused to flow through corresponding reaction containers to be post-saccharified, sterilized, diluted, acidified, treated with feed salts, cooled and guided through a continuously operating yeast producing device. The dilution takes place with water until the concentration of the yeast mashes amounts to 9 to 12° Bg. The yeast multiplication takes place in a cylindrical yeast producing container having a conical bottom, which before the operation is started is filled with yeast mashes pretreated in the above described manner, the mashes having been injected with basic yeast from a smaller container used for multiplying. After the yeast in the mashes has multiplied to 350 to 400 million cells/ml., a stationary condition is attained by blowing sterile air, in that a new nutritious solution is continuously introduced into the lower portion of the yeast producing container, while as many yeast cells are used to scour the yeast mashes flowing off the upper portion as are newly produced per time unit. Thus the yeast producing container must be of a size which will permit at least a 10-hour stay period.

The ripe yeast mashes which can be removed from the yeast producing container at a time corresponding to the required stay period are united with the larger partial stream of mashes behind a heat exchanger serving as the main cooler for the mashes, whereupon the united stream flows toward a fermentation battery.

The ferme antotnitbatery

The fermentation battery consists of several, preferably eight, cylindrical vessels connected with each other at alternate sides by tubular conduits. Fresh mashes treated with yeast flow into the first vessel and fill it to overflow. Then they flow through an overflow pipe into the second vessel, thence to the third one and finally fill the entire battery. The available sugar is fermented on the way through the battery. The fermented mashes are removed from the upper sections of the seventh and eighth vessels and are directed to a distillation apparatus for the separation of ethanol. A uniform continuous condition can be maintained in each vessel of the battery during fermentation. Heat developed essentially in the first vessels can be removed by cooling by means of cooling coils built into the first four vessels. When removing the yeast concentration the inflow can be divided between the first two or three vessels.

By alternately switching the overflow pipes which interconnect the vessels of the battery with corresponding regulating devices, it is possible to avoid interruption of the continuous flow of mashes when any desired vessel is switched off to be emptied, cleaned and disinfected. For pumping off the contents of a vessel which is to be cleaned, two separate pumps are inserted in the next vessel to prevent transmission of infection from a rear vessel to a front one and vice versa. The emptying of the last two vessels takes place by means of a third pump which transmits the mashes directly to the distillation device.

The solution of the present invention provides that mashes continuously removed from a continuously operating breaking up and saccharifying apparatus are continuously fermented anaerobically while flowing in an uninterrupted stream through a fermentation apparatus in a comparatively short time period of 56 to 64 hours, whereby new yeast formation takes place aerobically also continuously in specific surroundings protected from infection. By specific switching of the overflow pipes interconnecting the fermentation vessels the continuous flow through the fermentation battery is not disturbed by the necessary cleaning steps, so that the enetire system has a stable character. This provides an effective possibility for the automation of the process, namely, for actuating the apparatus of the present invention.

The invention will appear more clearly from the following detailed description when taken in connection with the accompanying drawing, the sole figure of which is a diagram illustrating the apparatus and a flow picture of the process of the present invention.

The flow diagram shows that a main flow A of mashes leaves a saccharifying device (not shown) of an apparatus for starch-containing distillery raw products, with a concentration of, for example 17° Bg. a pH value of 5.2 and a flowing amount of 1200 l./hr. This stream is divided into two partial streams $A_1$ and $A_2$. The pipe conduit receiving the smaller partial stream $A_2$ has an inductive regulator B for the flow amount which regulates a throttle valve so that the flow will continue constant, amounting to 100 l./hr. At the same time the partial stream $A_1$ is limited to 1100 l./hr. The partial stream $A_1$ flows through a heat exchanger N constituting the main mash cooler and is cooled thereby to a temperature of 22° C., for example, and then is guided directly to a fermentation battery. At the same time the partial stream $A_2$, having a temperature of about 55° C., flows into a post-saccharification device C. This device consists of a closed container with stirring means and double walls for heat exchange so as to maintain a temperature of 62° C. to 67° C. and a capacity of, for example, 180 l. After a duration of preferably 60 minutes, in the course of which the maximum formation of maltose takes place, the mashes are pumped off with a centrifugal pump D. By measuring the amount of the filling in the post-saccharification device and using this measurement for actuating a suitable regulating device, the outflow capacity of the pump is so regulated that the amount filling the container remains constant depending upon the desired duration of treatment; in the given example it is 100 l. The pump D transmits the mashes through a suitable flow sterilizer E in order to provide adequate sterilization continuing for 10 minutes at a temperature of 120° C., for example. Thereupon the mashes flow through a heat exchanger H in order to be cooled to a temperature of 25° C. to 30° C. and then into a yeast producing container J. At the same time a dosing or measuring pump G supplies diluted acid and feed salt solution into a connecting pipe located between the flow sterilizer E and the heat exchanger H. For that purpose a solution of, for example, 220 l. water, 320 ml. concentrated sulphuric acid and 400 gr. ammonium sulfate, is produced every four hours in one of the supply containers $F_1$ or $F_2$. This solution is dosed to the yeast mashes within the four hours in the described manner, so that its transportation flow rises to 155 l./hr. The yeast mashes have now a concentration of about 11° Bg. and a pH value of 3.8.

The yeast producing container J has a thin cylindrical body with a conical bottom. In the example set forth herein the capacity with reference to the foaming of the mashes should amount to 2400 l. Withdrawing passages are provided for filling capacities of 930 l., 1240 l., 1550 l. and 1860 l. to remove ripe yeast mashes, corresponding to a treating time of 6, 8, 10 or 12 hours. The lower conical part of the container has a jet pipe for aeration by means of which up to 225 $m.^3$ of filtered air can be blown in per hour.

Prior to the beginning of the continuous flow mother-yeast was treated in a preliminary treatment container K with malt worts and 150 l. were then supplied to the yeast producing container J. Then the container is filled with yeast mashes treated in the previously described manner to 1550 l. After the yeast concentration with continuous air flow has reached 380 mill. cells/ml., the operation of the entire plant can start. The lower conical portion of the yeast producing container J receives continuously a supply of prepared yeast mashes and the same amount of liquid with the corresponding yeast concentration is removed through an outlet valve located at a height of the vessel which corresponds to a filling of 1550 l. A multistage circular piston blower L is used to blow air in an amount of 186 $m.^3$/hr. through a cotton filter M into the container J, with the result the same amount of new yeast cells is produced in the container J per time unit, as has been washed away by the outflow.

The partial current $A_2$ which has now been enriched with 350 to 400 mill. yeast cells/ml., is now again united behind the heat exchanger N serving as the main cooler for the mashes and the combined stream flows into the first vessel $O_1$ of a fermentation battery. This battery consists of eight equally large vessels $O_1$ to $O_8$, each having a filling capacity of 11 $m.^3$ and a useful space of 10040 l. As soon as the vessel $O_1$ is full and the mashes move through a drop pipe into the vessel $O_2$, fresh mashes provided with yeast are uniformly distributed between the vessels $O_1$ and $O_2$. The entire fermentation battery is filled from vessel to vessel in this manner. As soon as the vessel $O_7$ had been filled for about 56 hours after the operation had started, the flow is switched to the vessels $O_2$ and $O_3$. The contents of the vessel $O_1$ are transmitted by a pump $P_2$ with a flow of 40 $m.^3$/hr. to the vessel $O_2$, so that the vessel $O_8$ is also filled at the same time. The mashes in container $O_8$ are now completely fermented and are transmitted by a pump $P_3$ through a pipe conduit R to the distillation plant. The vessel $O_1$ is now cleaned and sterilized. Then it is slowly filled again, in that the inflow is now again directed to the vessels $O_1$ and $O_2$. After about 16 hours, when the vesel $O_1$ is filled and the vessel $O_8$ is emptied, the inflow is directed to vessels $O_1$ and $O_3$, while the vessel $O_2$ is emptied so as to be cleaned and sterilized. The overflow from vessel $O_1$ is then directed to the vessel $O_3$ by the adjustment of a three-way valve. Thus the cleaning of the vessels takes place without interrupting the flow and about every 128 hours each vessel is emptied and disinfected. The pump $P_1$ is used for emptying the vesels $O_4$ to $O_6$, while the vessels $O_7$ and $O_8$ are emptied directly by the pump $P_3$. After each cleaning, rinsing water is removed by special outflow conduits S into the sewerage. Carbon dioxide developed during the fermentation can be liquified after known purification procedure in a wash column Q.

It is apparent that the example described above has been given solely by way of illustration and not by way of limitation and that it is capable of many variations and modifications within the scope of the present invention. All such variations and modifications are to be included within the scope of the present invention.

What is claimed is:

1. The process for the continuous fermentation of draff-containing mashes for the recovery of ethanol, which comprises dividing a flow of saccharified mashes into a larger partial stream and a smaller partial stream, the amounts of the two streams having a volume ratio ranging between 1:10 and 1:12, continuously saccharifying, sterilizing, cooling, diluting, acidifying and treating with feed salts said smaller partial stream, then enriching said smaller partial stream with yeast cells to a concentration ranging between 350 and 400 million cells per ml., then joining said smaller partial stream with said larger partial stream to form a single flowing stream, and fermenting said single flowing stream.

2. The process in accordance with claim 1, wherein the saccharification of said smaller partial stream continues for a time period ranging between 60 to 90 minutes, wherein the sterilization of said smaller partial stream continues for a time period ranging between 10 to 15 minutes at a temperature ranging between 100° C. and 125° C., wherein said smaller partial stream is cooled to a temperature ranging between 25° C. and 30° C., and wherein said smaller partial stream is treated by the addition of ammonium sulfate dissolved in water and diluted sulphuric acid until the concentration of the yeast mashes amounts to 9 to 12° Bg. and the pH value to 3.6 to 3.8, whereby every 100 l. yeast mashes receive from 60 gr. to 80 gr. ammonium sulfate.

3. The process in accordance with claim 2, further comprising treating other immovable mashes with mother-yeast while blowing filtered air therethrough until a concentration of at least 350 million cells per ml. is reached, then adding said smaller partial stream after its treatment with feed salts to said other mashes and later continuing the flow of said smaller partial stream, the duration of the addition step being varied to maintain constant the yeast concentration in the outflowing smaller partial stream.

4. An apparatus for the continuous fermentation of draff-containing mashes for the recovery of ethanol, which comprises a regulating device for dividing a flow of mashes which have been saccharified in the usual main saccharification device into a larger partial stream and a smaller partial stream, the amounts of the two streams having a volume ratio ranging between 1:10 and 1:12, a post-saccharification device for further maltose formation in mashes of the smaller partial stream and connected with said regulating device, a flow sterilizer, a pump connecting said post-saccharification device with said flow sterilizer for transmitting said smaller partial stream to said flow sterilizer, a heat exchanger, at least one container for feed substances, a conduit connecting said heat exchanger with said flow sterilizer, another measuring pump connected with said container and said conduit for supplying said feed substances to the smaller partial stream flowing through said conduit to said heat exchanger, a yeast producing container connected with said heat exchanger and receiving the smaller partial stream from said heat exchanger, means connected with said yeast producing container and said regulating device for joining said smaller partial stream having said yeast producing container with said larger partial stream to form a single stream, and a fermentation battery for fermenting said single stream, said battery consisting of a plurality of vessels each of which has a volume which is four to five times larger than that of the yeast producing container.

5. An apparatus in accordance with claim 4, wherein said regulating device comprises an inductive flow regulator with a throttle valve, wherein said post-saccharification device comprises a container having heat exchange surfaces and stirring means within the container and wherein said yeast producing container has a cylindrical body, a control bottom, a plurality of interconnected outflow conduits mounted one above the other upon said body, and valves carried by said conduits, said conduits being connected with the first-mentioned means.

6. An apparatus in accordance with claim 4, further comprising a preliminary treatment container connected to said yeast producing container and means blowing filtered air through said yeast producing container.

7. An apparatus in accordance with claim 4, wherein the vessels of the fermenting battery are interconnected.

8. An apparatus in accordance with claim 7, wherein said fermenting battery comprises eight vessels and means directing the flow of the single stream initially to one of said vessels and then to two vessels.

9. An apparatus in accordance with claim 7, wherein said fermenting battery further comprises regulating devices directing an overflow selectively from one vessel to an adjacent vessel or to a vessel following the adjacent vessel.

10. An apparatus in accordance with claim 7, wherein each of said vessels is cylindrical and has a conical bottom, overflow pipes interconnecting said vessels, each of said vessels having a separate three way valve upon an overflow pipe, said pipes opening tangentially into a following vessel and the vessel thereafter to introduce the overflowing mashes into the following vessel as well as the vessel which follows that vessel.

11. An apparatus in accordance with claim 7, wherein said fermenting battery further comprises three pumps for emptying said vessels, whereby to avoid transmission of infection the first three vessels are emptied by one of said pumps, the three following vessels are emptied by the other one of said pumps and the remaining vessels are emptied by the third pump, said pumps being also adapted to empty the vessels directly.

References Cited
UNITED STATES PATENTS
2,662,842    12/1953    Christensen            195—17

A. LOUIS MONACELL, Primary Examiner

G. M. NATH, Assistant Examiner

U.S. Cl. X.R.

99—42, 51; 195—39, 41, 115